(12) United States Patent
Obata (10) Patent No.: US 6,285,843 B1
(45) Date of Patent: Sep. 4, 2001

(54) IMAGE FORMING METHOD AND APPARATUS HAVING SUSPENSION OF IMAGE FORMING PROCESS AND DISPLAY CAPABILITIES

(75) Inventor: Satoshi Obata, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,544

(22) Filed: Mar. 13, 2000

(51) Int. Cl.[7] .................................................. G03G 15/00
(52) U.S. Cl. ............................. 399/82; 399/83; 399/87
(58) Field of Search .................................. 399/82, 83, 85, 399/87, 389, 390, 391, 21, 23; 395/181, 182.02, 183.01, 183.02, 826, 860

(56) References Cited

U.S. PATENT DOCUMENTS 5,245,368 * 9/1993 Farrell et al. ...................... 399/87 X
5,918,088   6/1999 Rikima ................................... 399/82
6,125,242 * 9/2000 Yamada ................................. 399/23

FOREIGN PATENT DOCUMENTS 10-210196   8/1998 (JP) .

* cited by examiner

Primary Examiner—Arthur T. Grimley
Assistant Examiner—Hoan Tran
(74) Attorney, Agent, or Firm—Foley & Lardner (57) ABSTRACT

Where any one of a plurality of print jobs is not normally executable due to a cause such as run-out of paper, the print job which is not normally executable is suspended, and another print job is successively executed. Thereby, even where any one of a plurality of print jobs is not normally executable, another print job can be successively executed without interrupting the operation of a copying machine.

16 Claims, 9 Drawing Sheets

| | | |
|---|---|---|
| HOST DATA | ORIGIN OF JOB: | PERSONAL COMPUTER 1 |
| | NUMBER OF COPIES: | 10 |
| | DOUBLE-SIDE PRINT DESIGNATION: | DOUBLE-SIDE |
| | SORT MODE DESIGNATION: | SORT |
| 1ST PAGE | SHEET SIZE: | A4 |
| | ORIGIN OF SHEET SUPPLY: | LARGE-CAPACITY CASSETTE |
| | IMAGE DATA: | A4 IMAGE DATA |
| 2ND PAGE | SHEET SIZE: | A3 |
| | ORIGIN OF SHEET SUPPLY: | UPPER CASSETTE |
| | IMAGE DATA: | A3 IMAGE DATA |
| 3RD PAGE | SHEET SIZE: | A3 |
| | ORIGIN OF SHEET SUPPLY: | UPPER CASSETTE |
| | IMAGE DATA: | A3 IMAGE DATA |
| 4TH PAGE | SHEET SIZE: | B4 |
| | ORIGIN OF SHEET SUPPLY: | MIDDLE CASSETTE |
| | IMAGE DATA: | B4 IMAGE DATA |
| 5TH PAGE | SHEET SIZE: | B4 |
| | ORIGIN OF SHEET SUPPLY: | MIDDLE CASSETTE |
| | IMAGE DATA: | B4 IMAGE DATA |

| | | F |
|---|---|---|
| JOB HEADER Fa | ORIGIN OF JOB | PERSONAL COMPUTER 1 |
| | NUMBER OF COPIES | 10 |
| | DOUBLE-SIDE PRINT DESIGNATION | DOUBLE-SIDE |
| | SORT MODE DESIGNATION | SORT |
| | TOTAL PAGE NUMBER | 5 |
| PAGE HEADER Fb | SHEET SIZE | A4 |
| | ORIGIN OF SHEET SUPPLY | LARGE-CAPACITY CASSETTE |
| IMAGE DATA Fc | IMAGE DATA | A4 IMAGE DATA |
| PAGE HEADER Fb | SHEET SIZE | A3 |
| | ORIGIN OF SHEET SUPPLY | UPPER CASSETTE |
| IMAGE DATA Fc | IMAGE DATA | A3 IMAGE DATA |
| PAGE HEADER Fb | SHEET SIZE | A3 |
| | ORIGIN OF SHEET SUPPLY | UPPER CASSETTE |
| IMAGE DATA Fc | IMAGE DATA | A3 IMAGE DATA |
| PAGE HEADER Fb | SHEET SIZE | B4 |
| | ORIGIN OF SHEET SUPPLY | MIDDLE CASSETTE |
| IMAGE DATA Fc | IMAGE DATA | B4 IMAGE DATA |
| PAGE HEADER Fb | SHEET SIZE | B4 |
| | ORIGIN OF SHEET SUPPLY | MIDDLE CASSETTE |
| IMAGE DATA Fc | IMAGE DATA | B4 IMAGE DATA |

Rows grouped as: page1 (first PAGE HEADER + IMAGE DATA), page2, page3, page4, page5.

| | |
|---|---|
| JOB HEADER F1a | |
| ORIGIN OF JOB | PERSONAL COMPUTER 1 |
| NUMBER OF COPIES | 10 |
| DOUBLE-SIDE PRINT DESIGNATION | SINGLE-SIDE |
| SORT MODE | SORT |
| TOTAL PAGE NUMBER | 1 |
| PAGE HEADER F1b | |
| SHEET SIZE | A4 |
| ORIGIN OF SHEET SUPPLY | LARGE-CAPACITY CASSETTE |
| IMAGE DATA F1c | |
| IMAGE DATA | A4 | page1

| | |
|---|---|
| JOB HEADER F2a | |
| ORIGIN OF JOB | PERSONAL COMPUTER 1 |
| NUMBER OF COPIES | 10 |
| DOUBLE-SIDE PRINT DESIGNATION | DOUBLE-SIDE |
| SORT MODE | SORT |
| TOTAL PAGE NUMBER | 2 |
| PAGE HEADER F2b | |
| SHEET SIZE | A3 |
| ORIGIN OF SHEET SUPPLY | UPPER CASSETTE |
| IMAGE DATA F2c | |
| IMAGE DATA | A3 |
| PAGE HEADER F2b | |
| SHEET SIZE | A3 |
| ORIGIN OF SHEET SUPPLY | UPPER CASSETTE |
| IMAGE DATA F2c | |
| IMAGE DATA | A3 | page2, page3

| | |
|---|---|
| JOB HEADER F3a | |
| ORIGIN OF JOB | PERSONAL COMPUTER 1 |
| NUMBER OF COPIES | 10 |
| DOUBLE-SIDE PRINT DESIGNATION | DOUBLE-SIDE |
| SORT MODE | SORT |
| TOTAL PAGE NUMBER | 2 |
| PAGE HEADER F3b | |
| SHEET SIZE | B4 |
| ORIGIN OF SHEET SUPPLY | MIDDLE CASSETTE |
| IMAGE DATA F3c | |
| IMAGE DATA | B4 |
| PAGE HEADER F3b | |
| SHEET SIZE | B4 |
| ORIGIN OF SHEET SUPPLY | MIDDLE CASSETTE |
| IMAGE DATA F3c | |
| IMAGE DATA | B4 | page4, page5

```
ALARM
PRINT OF 2ND AND 3RD    ~PCa
PAGES FAILED
```

IMAGE FORMING METHOD AND APPARATUS HAVING SUSPENSION OF IMAGE FORMING PROCESS AND DISPLAY CAPABILITIES

BACKGROUND OF THE INVENTION

The present invention relates to an image forming method for a composite-type digital copying machine having, for example, a copying function, a network printer function and a facsimile function.

In a conventional image forming apparatus such as a digital copying machine, a print job consisting of image data and print information is stored as a job file in a memory such as a hard-disk drive. Where a plurality of job files are stored in a hard-disk drive, plural print jobs based on the respective job files are successively executed.

In addition, in order to simplify the processing of a print job, a plurality of job files are generated by dividing one print job in accordance with common items of print conditions, such as a sheet size and a resolution, and thus printing is executed.

However, where a print process based on a job file is executed, if it cannot normally be executed due to some cause, the process is suspended and the digital copying machine stands in an error state. Consequently, where there are a plurality of job files to be successively executed, if any one of plural jobs is not normally executed due to some cause, the process is suspended at that time and the digital copying machine stands in an error state. In such a case, there arises a problem in that the digital copying machine cannot execute processing of the job files remaining in the hard-disk drive until the user goes to the front of the digital copying machine and the error state is remedied.

BRIEF SUMMARY OF THE INVENTION

As has been described above, the problem in the prior art is that where any one of a plurality of print jobs becomes unexecutable, the operation of the apparatus is suspended and the remaining print jobs cannot successively executed. The present invention aims at solving this problem, and the object of the invention is to provide an image forming method wherein even where any one of a plurality of print jobs becomes unexecutable, the operation of the apparatus is not suspended and the remaining print jobs can successively executed.

According to the present invention, there is provided an image forming method for an image forming apparatus comprising a plurality of storage means for respectively containing various image forming mediums, a memory for storing operation files composed of image formation conditions and image information for respective pages, and image forming means for selecting the storage means in accordance with the image formation conditions of the operation files stored in the memory and performing an image forming process with image formation on the image forming mediums stored in the selected storage means, wherein where the image forming process based on any one of the plurality operation files stored in the memory is not normally executable, the image forming process based on the operation file which is not normally executable is suspended, and the image forming process based on an operation file other than the operation file associated with the suspended image forming process is successively executed.

According to the invention, there is provided an image forming apparatus comprising: a plurality of storage means for respectively containing various image forming mediums; a memory for storing operation files composed of image formation conditions and image information for respective pages; image forming means for selecting the storage means in accordance with the image formation conditions of the operation files stored in the memory and performing an image forming process with image formation on the image forming mediums stored in the selected storage means; suspension means for suspending, where the image forming process based on any one of the plurality operation files stored in the memory is not normally executable, the image forming process based on the operation file which is not normally executable; and execution means for successively executing the image forming process based on an operation file other than the operation file associated with the suspended image forming process.

According to the invention, there is provided an image forming method for an image forming system comprising an image forming apparatus having a plurality of storage means for respectively containing various image forming mediums, a memory for storing operation files composed of image formation conditions and image information for respective pages, and image forming means for selecting the storage means in accordance with the image formation conditions of the operation files stored in the memory and performing an image forming process with image formation on the image forming mediums stored in the selected storage means, and an external apparatus having a display section for displaying guidance to a user and being connected to the image forming apparatus, characterized in that the image forming apparatus receives from the external apparatus image formation information composed of image formation conditions and image information for respective pages; operation files to be stored in the memory are generated on the basis of the received image formation information; where the image forming process based on any one of the plurality operation files stored in the memory is not normally executable, the image forming process based on the operation file which is not normally executable is suspended; the image forming process based on an operation file other than the operation file associated with the suspended image forming process is successively executed; when the image forming process based on the operation file which is not normally executable is suspended, a content of the operation file associated with the suspended image forming process is reported to the external apparatus, or an origin of transmission of the image formation information, and the external apparatus which has received the report displays on the display section the content of the operation file associated with the suspended image forming process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
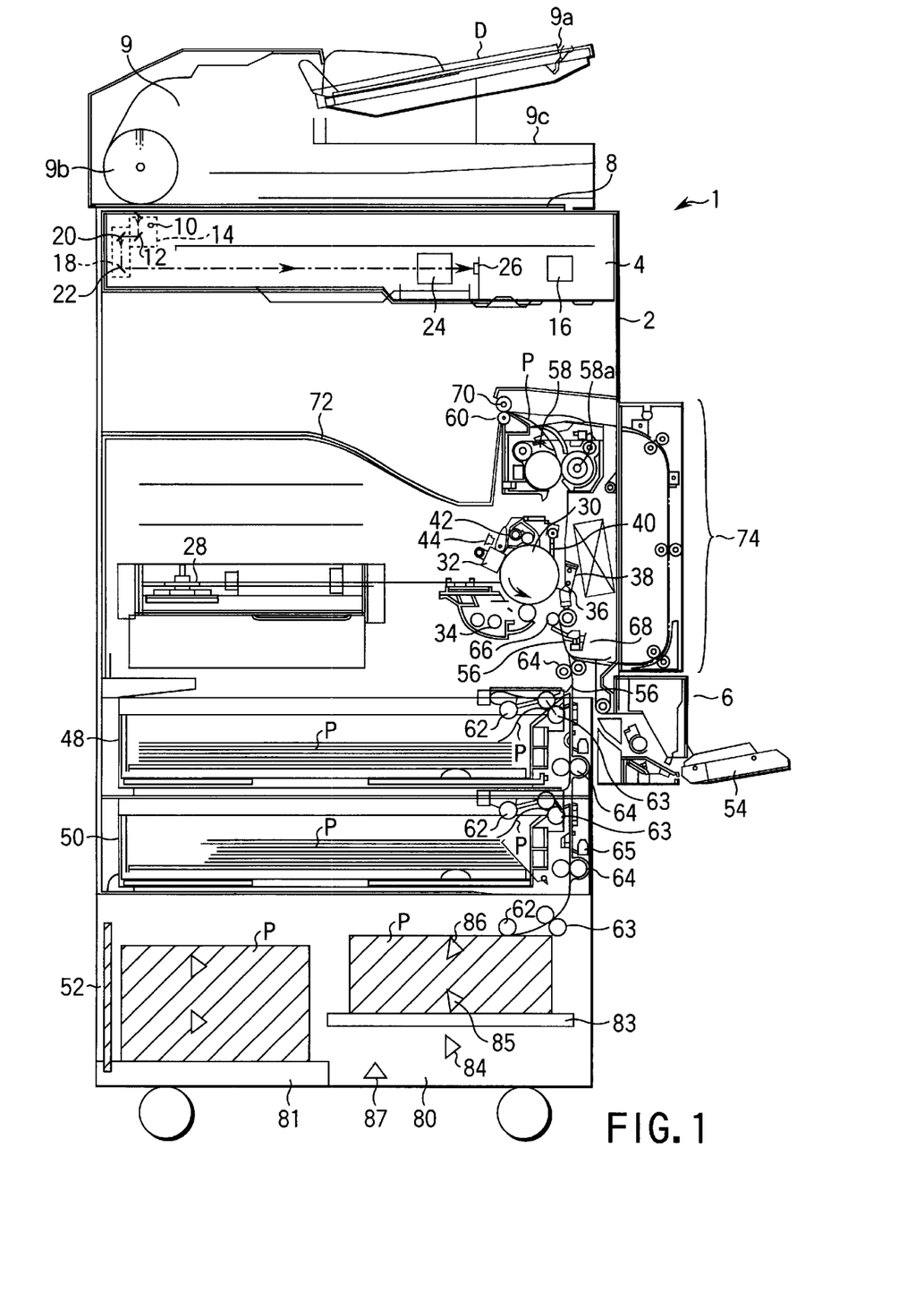
FIG. 1 is a cross-sectional view showing a schematic structure of a digital copying machine according to an image forming apparatus of the present invention.

FIG. 1 is a cross-sectional view showing a schematic structure of a digital copying machine 1 as an example of an image forming apparatus to which an image forming method of the present invention is applied.

As is shown in FIG. 1, the digital copying machine 1 has an apparatus main body 2. The apparatus main body 2 incorporates a scanner section 4 functioning as an image reading means and a printer section 6 functioning as an image forming means.

An original table 8 formed of transparent glass, on which a read object, i.e. an original D is placed, is disposed on the upper surface of the apparatus main body 2. An automatic document feeder 9 (hereinafter referred to as "ADF") for automatically feeding the original D onto the original table 8 is disposed on the upper surface of the apparatus main body 2.

The original D placed on an original tray 9a of the ADF 9 is conveyed by a convey guide (not shown) and discharged onto a discharge tray 9c via a platen roller 9b. While the original D is being conveyed by the platen roller 9b, it is exposed and scanned by the scanner section 4 (to be described later). Thus, an image on the original D is read.

The scanner section 4 provided in the apparatus main body 2 has an exposure lamp 10 comprising, for example, a halogen lamp, serving as a light source for illuminating the original D conveyed by the ADF 9 or the original D placed on the original table 8, and a first mirror 12 for deflecting reflection light from the original D in a predetermined direction. The exposure lamp 10 and first mirror 12 are attached to a first carriage 14 disposed under the original table 8.

The first carriage 14 is disposed to be movable in parallel to the original table 8 and reciprocally moved under the original table 8 by a scanner motor (drive motor) 16 through a toothed belt (not shown), etc. The scanner motor 16 comprises, for example, a stepping motor.

A second carriage 18 movable in parallel to the original table 8 is disposed under the original table 8. Second and third mirrors 20 and 22 for sequentially deflecting reflection light from the original D, which has been deflected by the first mirror 12, are attached to the second carriage 18 at right angles with each other. A torque is transmitted from the scanner motor 16 to the second carriage 18 via, e.g. the toothed belt for driving the first carriage 14. The second carriage 18 is thus moved in accordance with the movement of the first carriage 14 in parallel to the original table 8 at half the speed of the first carriage 14.

A focusing lens 24 for focusing reflection light from the third mirror 20 mounted on the second carriage 18, and a CCD sensor (line sensor) 26 for receiving the reflected light focused by the focusing lens 24 and photoelectrically converting it are also disposed under the original table 8. The focusing lens 24 is disposed in a plane including the optical axis of the light deflected by the third mirror 22 so as to be movable by means of a driving mechanism. The focusing lens 24 moves to focus the reflection light at a desired magnification (in a main scan direction). The CCD sensor 26 photoelectrically converts the reflection light, which is input in accordance with an image processing clock delivered from a main CPU (to be described later), and outputs an electrical signal corresponding to the read original D. A magnification in a sub-scan direction is controlled by varying a speed of conveyance by the ADF 9 or a speed of movement of the first carriage 14.

Where the original D conveyed by the ADF 9 is read, the position of radiation of the exposure lamp 10 is fixed at a point shown in FIG. 1. Where the original D placed on the original table 8 is read, the position of radiation of the exposure lamp 10 is shifted from the left to the right along the original table 8.

On the other hand, the printer section 6 has a laser exposure unit 28 functioning as a latent image forming means. A peripheral surface of a photosensitive drum 30 is scanned by a laser beam from the laser exposure unit 28, and thus an electrostatic latent image is formed on the peripheral surface of a photosensitive drum 30.

The printer section 6 has the rotatable photosensitive drum 30 as an image carrier disposed almost at the center of the apparatus main body 2. The peripheral surface of the photosensitive drum 30 is exposed to the laser beam from the laser exposure unit 28, and so a desired electrostatic latent image is formed thereon. Around the photosensitive drum 30, the following elements are arranged in the named order: a charger 32 for electrifying the peripheral surface of the drum with a predetermined charge; a developing device 34 for supplying toner as a developer to the electrostatic latent image formed on the peripheral surface of the photosensitive drum 30 to develop it at a desired image density; a transfer charger 38 which is integrated with a separation charger 36 for separating an image formation medium, i.e. a copy paper sheet P fed from a cassette 48, 50 or an LCF 52 (to be described later) and transfers the toner image formed on the photosensitive drum 30 onto the paper sheet P; a separation gripper 40 for separating the copy paper sheet P from the peripheral surface of the photosensitive drum 30; a cleaning unit 42 for removing toner remaining on the outer peripheral surface of the photosensitive drum 30; and a destaticizer 44 for de-electrifying the peripheral surface of the photosensitive drum 30.

An upper cassette 48, a middle cassette 50 and a tandem-type large-capacity feeder (tandem LCF) 52 serving as one of large-capacity feeders are disposed in a stacked fashion. These cassettes 48 and 50 and LCF 52 store copy paper sheets P of different sizes. A manual feed tray 54 is disposed on a side of the upper cassette 48.

A convey path 56 extending from the cassette 48, 50 or LCF 52 through a transfer section located between the photosensitive drum 30 and transfer charger 38 is formed in the apparatus main body 2. A fixing unit 58 having a fixing lamp 58a is disposed at the end of the convey path 56. A discharge port 60 is formed above the fixing unit 58.

Feed rollers 62 and separation rollers 63 for extracting the paper sheets P one by one from the cassettes 48, 50 and LCF 52 are arranged near the upper cassette 48, middle cassette 50 and LCF 52. A number of feed roller pairs 64 for conveying the copy paper sheet P extracted by the feed rollers 62 and separation rollers 63 through the convey path 56 are arranged in the convey path 56. A conveyance sensor 65 for sensing the conveyance state is provided near each feed roller pair 64.

A registration roller pair 66 is arranged in the convey path 56 on the upstream side of the photosensitive drum 30. The registration roller pair 66 corrects a tilt of the extracted copy paper sheet P, registers the leading edge of the toner image on the photosensitive drum 30 and the leading edge of the copy paper sheet P, and feeds the copy paper sheet P to the transfer section at the same speed as the speed of movement of the peripheral surface of the photosensitive drum 30. A prealigning sensor 68 for detecting arrival of the copy paper sheet P is provided in front of the registration roller pair 66, that is, on the feed roller 64 side.

Each copy paper sheet P extracted from the cassette 48, 50 or LCF 52 by the feed rollers 62 is fed to the registration roller pair 66 by the feed roller pair 64. After the leading edge of the copy paper sheet P is aligned by the registration roller pair 66, the copy paper sheet P is fed to the transfer section.

In the transfer section, a development image, i.e. toner image formed on the photosensitive drum 30 is transferred onto the paper sheet P by the transfer charger 38. The copy paper sheet P on which the toner image has been transferred is separated from the peripheral surface of the photosensitive drum 30 by the function of the separation charger 36 and separation gripper 40 and conveyed to the fixing unit 58 through a conveyor belt (not shown) constituting part of the convey path 56. After the developer image is melted and fixed on the copy paper sheet P by the fixing unit 58, the copy paper sheet P is delivered onto a discharge tray 72 in the apparatus main body 2 through the discharge port 60 by a feed roller pair 70.

An automatic double-side unit 74 for reversing the copy paper sheet P which has passed through the fixing unit 58 and feeding it to the convey path 56 once again is provided on the right side of the convey path 56.

An operation panel (to be described later) for instructing various copy conditions and a copy start is provided at the upper portion on the front side of the apparatus main body 2.

Figure 2:
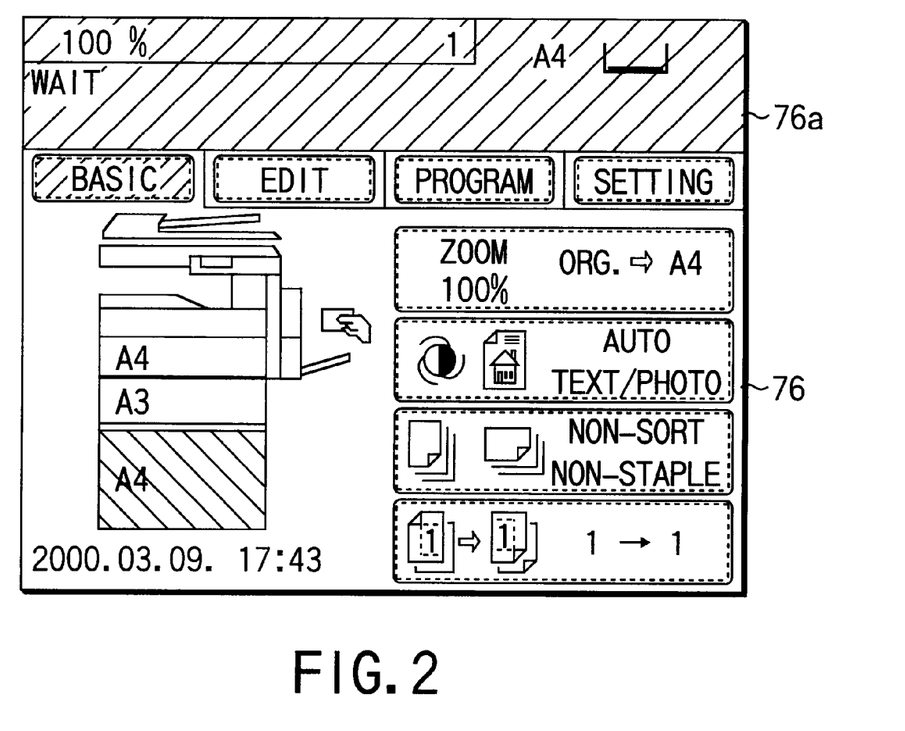
FIG. 2 shows a liquid-crystal display unit incorporating touch keys provided on an operation panel.

The operation panel, as shown in FIG. 2, is provided with a liquid-crystal display unit (LCD) 76 incorporating touch keys capable of effecting operation guidance and various instructions.

The liquid-crystal display unit 76 has an operation guidance display section 76a. The operation guidance display section 76a displays an operation guidance such as "WAIT." For example, when a run-out of paper in the cassette has occurred, the operation guidance display section 76a displays an alarm on the run-out of paper in the cassette.

The digital copying machine 1 has a network printer function in addition to a copying function. The digital copying machine 1 is connected to an external apparatus, such as a personal computer PC or a server (not shown), via a local area network (LAN). The personal computer PC serving as the external apparatus has a display section PCa. The display section PCa displays a message, etc. reported from the digital copying machine in accordance with print data.

Figure 3:
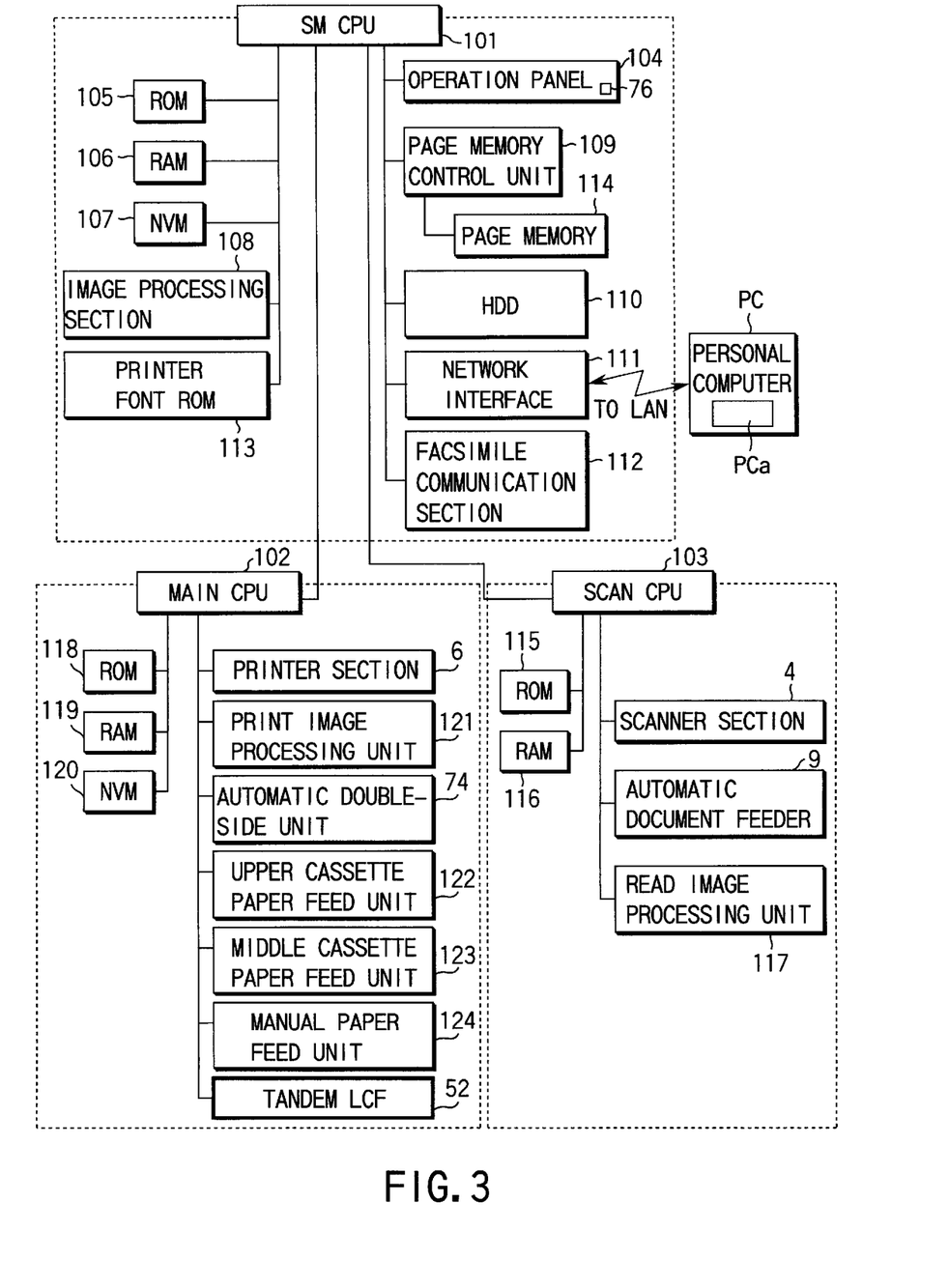
FIG. 3 is a block diagram showing a structure of a control system of a digital copying machine.

FIG. 3 is a block diagram showing a structure of a control system of the digital copying machine 1.

The control system of the digital copying machine 1 is constituted by three CPUs: an SM (System Main)-CPU 102 functioning as a main control unit, a MAIN-CPU 102 for controlling the printer section 6, and a SCAN-CPU 103 for controlling the scanner section 4.

The SM-CPU 101 performs serial communication with the MAIN-CPU 102. The SM-CPU 101 issues operational instructions, and the MAIN-CPU 102 executes operations on the basis of the instructions and, at the same time, returns the operational status.

Thus, all operational states are returned to the SM-CPU 101 as statuses, and the SM-CPU 101 can recognize the statuses at all times. On the basis of the statuses and the content input from the operation panel 104, the SM-CPU 101 controls the entirety of the digital copying machine 1.

To the SM-CPU 101, connected are: a ROM 105, a RAM 106, an NVM 107, an image processing section 108, a page memory control unit 109, a hard-disk drive 110, a network interface 111, a facsimile communication section 112 and a printer font ROM 113.

The SM-CPU 101 controls the entirety of the digital copying machine 1. The ROM 105 stores various control programs and control data. The RAM 106 temporarily stores data.

The NVM (nonvolatile random access memory (RAM)) 107 is a nonvolatile memory backed up by a battery (not shown). When power is turned off, data on the NVM 107 is kept.

The image processing section 108 comprises an image processing circuit, etc. and performs image processing such as trimming, masking, image compression, and image decompression. The page memory control unit 109 stores image data in a page memory 114 and reads out image data from the page memory 114.

The hard-disk drive 110 stores image data in a file format and control data. The network interface 109 is connected to a local area network (LAN) via a communication line. Print data from the external apparatus, such as a personal computer, connected to the LAN is received by the network interface 109.

The facsimile communication section 112 transmits and receives facsimile data via a communication line (not shown) such as a public line. The printer font ROM 113 stores font data corresponding to code data of character codes, etc.

The HDD 110 stores image data converted in a file format by the image processing section 108. When print data is received by the network interface 111, the HDD 110 stores job files (to be described later) generated according to print data.

To the SCAN-CPU 104, connected are a ROM 115, a RAM 116, scanner section 4, ADF 9, and a read image processing unit 117.

Based on the SM-CPU 101, the SCAN-CPU 104 controls the scanner section 4, ADF 9 and read image processing unit 117. The ROM 115 stores various control programs and control data. The RAM 116 temporarily stores data. The read image processing unit 117 executes a process of image correction, etc. for an original image read by the scanner section 4.

To the MAIN-CPU 102, connected are: a ROM 118, a RAM 119, an NVM 120, printer section 6, a print image processing unit 121, automatic double-side unit 74, an upper cassette paper feed unit 122, a middle cassette paper feed unit 123, a manual paper feed unit 124, and large-capacity feeder 52.

Based on the SM-CPU 101, the MAIN-CPU 102 controls the printer section 6, print image processing unit 121, automatic double-side unit 74, upper cassette paper feed unit 122, middle cassette paper feed unit 123, manual paper feed unit 124, and LCF 52. The ROM 118 stores various control programs and control data. The RAM 119 temporarily stores data. The NVM 120 is a nonvolatile memory backed up by a battery (not shown).

The print image processing unit 121 performs shading correction, a smoothing process, edge emphasis, an enlargement/reduction process, a gradient process, etc. The upper cassette paper feed unit 122 feeds paper by means of the upper cassette 48. The middle cassette paper feed unit 123 feeds paper by means of the middle cassette 50. The manual paper feed unit 124 feeds paper by means of the manual feed tray 54.

The image processing section 108, page memory 114, read image processing unit 117 and print image processing 121 are connected by an image data bus (not shown).

Figure 4:
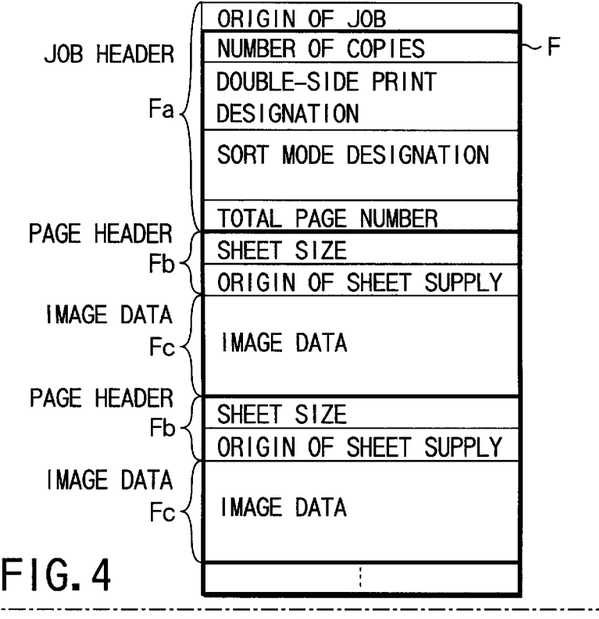
FIG. 4 shows an example of a structure of a job file stored in a hard-disk drive.

FIG. 4 shows an example of a structure of a job file F stored in the hard-disk drive 110. The job file F is a file formed by representing a print job consisting of image data and print information in a file-format. The job file F is created when a print job has occurred, and it is stored in the hard-disk drive 110.

For example, when a copy process (copy job) is to be executed, a job file F representing a print job for image data read by the scanner section 4 is created. In addition, when a print process for print data via a network (a print job via a network) is to be executed, a job file F representing a print job for image data received by the network interface 111 via the LAN is created. Besides, a print process for facsimile reception data (a print job by facsimile) is to be executed, a job file F representing a print job for facsimile data received by the facsimile communication section 112 is created.

As is shown in FIG. 4, the job file F comprises information on the whole job and information on each page. The information on the whole job is recorded as a job header Fa set for each job file F. The information on each page is recorded as a page header Fb and image data Fc. In the job file F, page headers Fb and image data for all individual pages are recorded after the job header Fa.

The job header Fa comprises items such as an origin of job, a number of copies, double-side print designation, print order designation, sort mode designation, and a total page number.

In the item of the origin of job, information indicating an origin from which a print job is issued is recorded, where printing for image data received from the external apparatus is to be performed. In the item of the number of copies, information indicating a number of copies to be printed is recorded. In the item of the double-side print designation, information designating single-side printing or double-side printing is recorded. In the item of the sort mode designation, information designating whether a print result is to be sorted, or whether a sort mode is set, is recorded. In the item of the total page number, information indicating a total page number of image data to be printed is recorded.

The page header Fb comprises items such as a sheet size and an origin of sheet supply. In the item of the sheet size in the page header Fb, information designating a size of print paper sheet is recorded. The image data Fc is image data for one page to be printed. In the item of the origin of sheet supply in the page header Fb, information designating a sheet supply cassette for supplying print paper is recorded.

Figure 5:
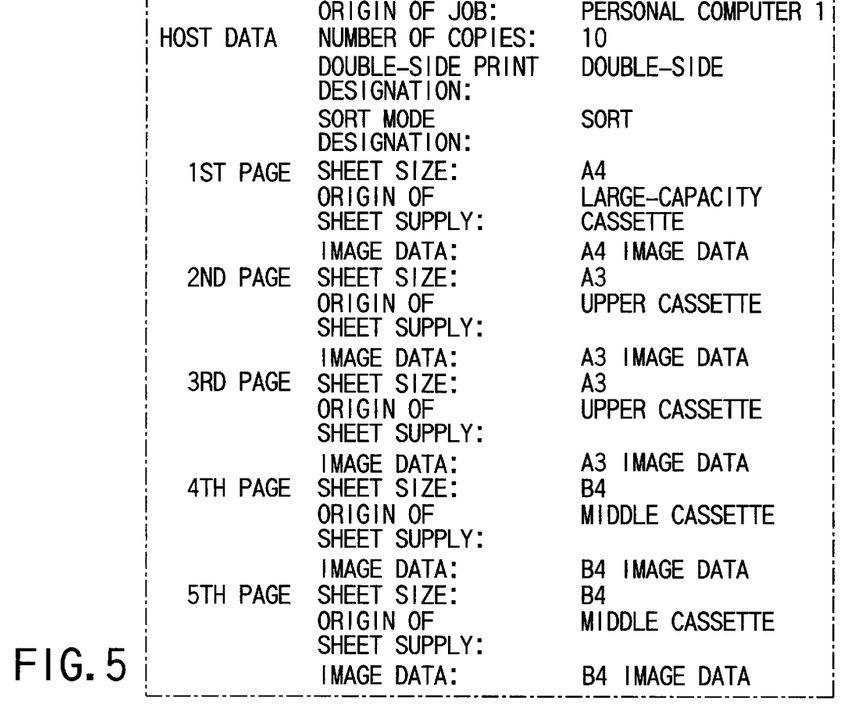
FIG. 5 shows an example of print data transmitted from an external apparatus via a LAN.

FIG. 5 shows an example of print data transmitted from the personal computer via the LAN. As is shown in FIG. 5, the print data sent via the LAN comprises items such as an origin of job, a number of copies, double-side print designation, sort mode designation, a sheet size for each page, an origin of sheet supply and image data, like the items recorded in the job file F.

In FIG. 5, as regards the respective items, the origin of job is the personal computer, the number of copies is 10, the double-side print designation is set to "DOUBLE-SIDE", and the sort mode designation is set to "SORT."

In FIG. 5, the items relating to each page are set as follows. on the first page, the sheet size is A4, the origin of sheet supply is the upper cassette, and the image data is A4 image data. On the second page, the sheet size is A3, the origin of sheet supply is the lower cassette, and the image data is A3 image data. On the third page, the sheet size is A3, the origin of sheet supply is the lower cassette, and the image data is A3 image data. on the fourth page, the sheet size is B4, the origin of sheet supply is the large-capacity cassette, and the image data is B4 image data. On the fifth page, the sheet size is B4, the origin of sheet supply is the large-capacity cassette, and the image data is B4 image data.

Figure 6:
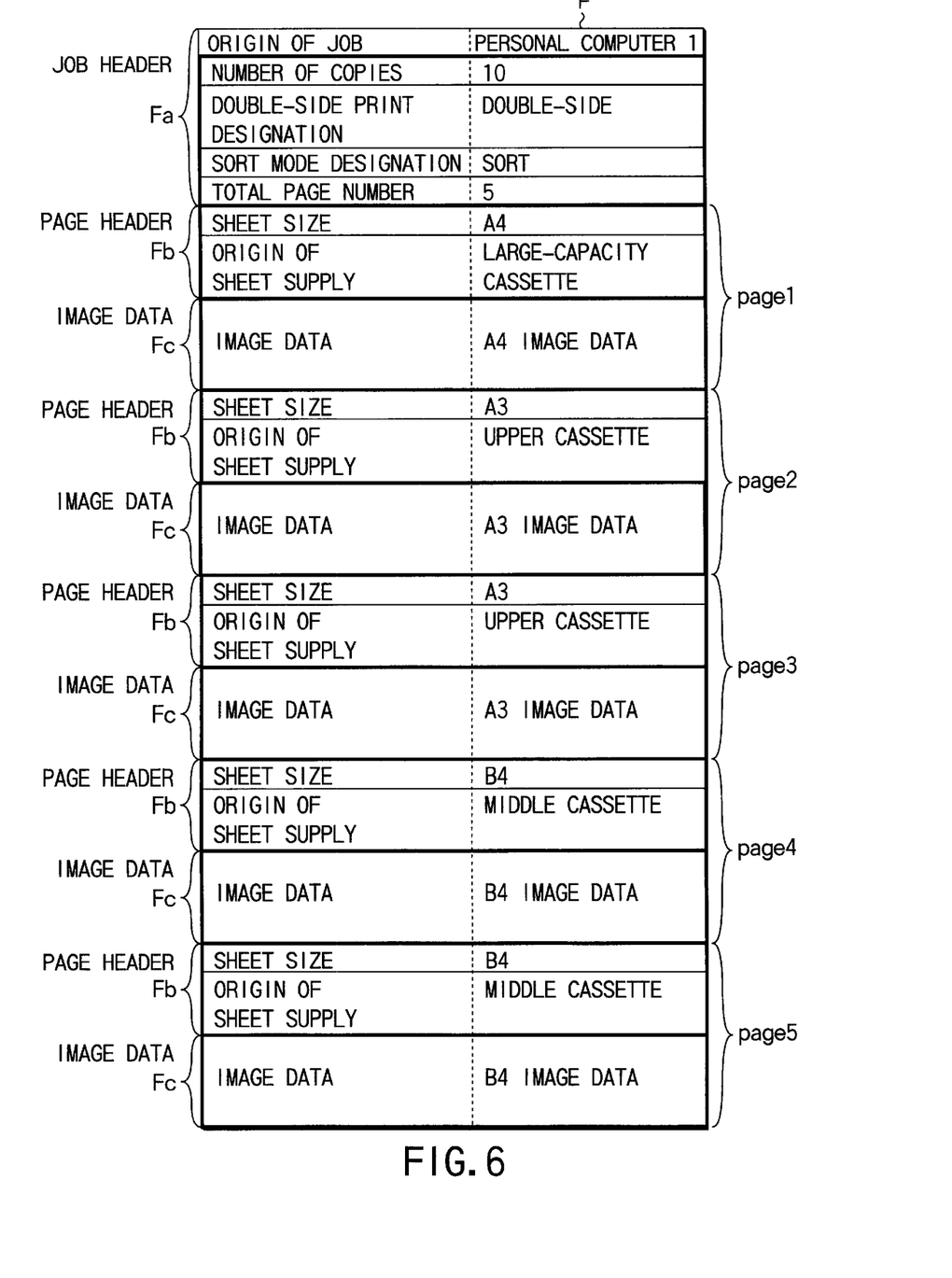
FIG. 6 shows a job file generated from print data.

FIG. 6 shows a structure of a job file F formed to represent the print data shown in FIG. 5 as one print job.

As is shown in FIG. 6, the job file F comprises a job header Fa, and page headers Fb and image data Fc for five pages. In the job header Fa, the number of copies is 10, the double-side print designation is set to "DOUBLE-SIDE", the sort mode designation is set to "SORT", and the total page number is five.

In the page header Fb following the job header Fa, the sheet size is A4 and the origin of sheet supply is the upper cassette, and the following image data Fc is A4 image data. In the following page header Fb, the sheet size is A3 and the origin of sheet supply is the lower cassette, and the following image data Fc is A3 image data. In the following page header Fb, the sheet size is A3 and the origin of sheet supply is the lower cassette, and the following image data Fc is A3 image data. In the following page header Fb, the sheet size is B4 and the origin of sheet supply is the large-capacity cassette, and the following image data Fc is B4 image data. In the following page header Fb, the sheet size is B4 and the origin of sheet supply is the large-capacity cassette, and the following image data Fc is B4 image data.

A description will now be given of a case where the job file associated with print data is divided on the basis of the origin of sheet supply.

Figure 7:
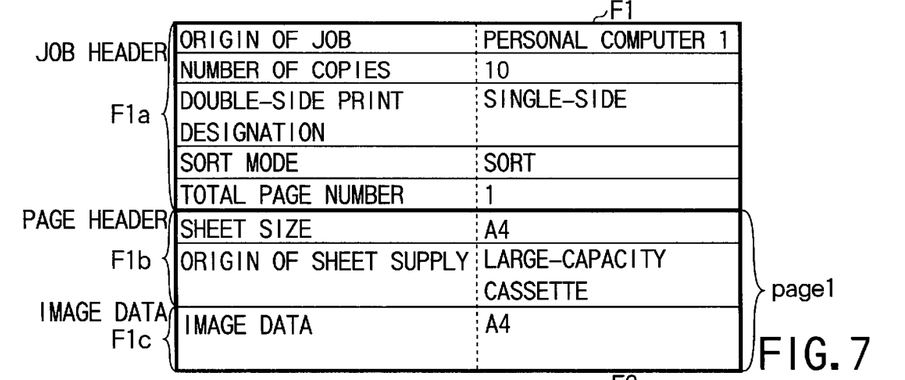
FIG. 7 shows a divided job file based on print data.
Figure 8:
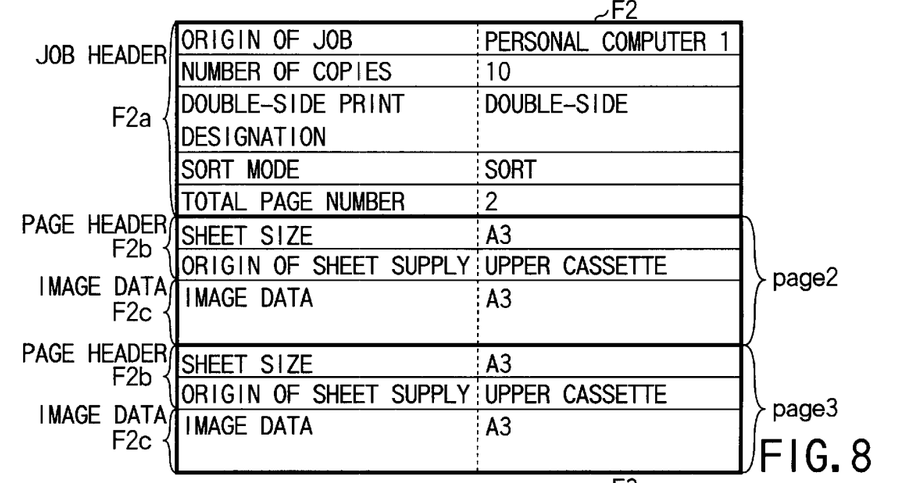
FIG. 8 shows a divided job file based on print data.
Figure 9:
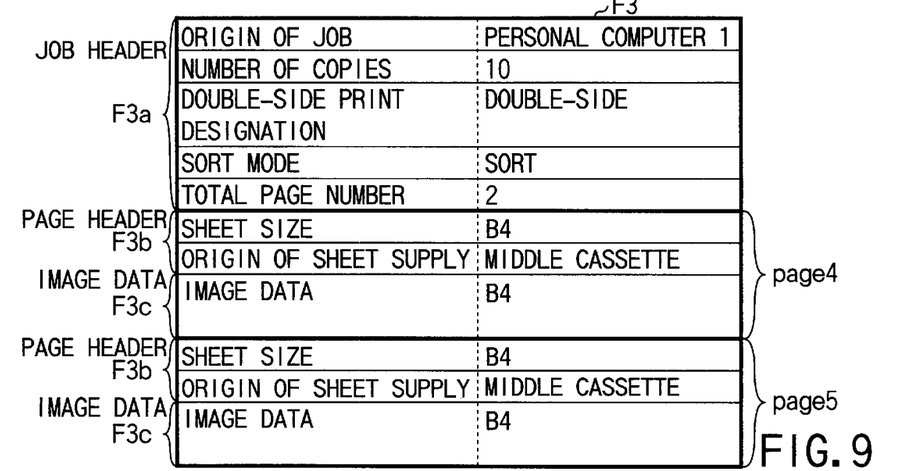
FIG. 9 shows a divided job file based on print data.

FIGS. 7 to 9 show structures of three job files associated with the print data shown in FIG. 5, which are divided in accordance with the origin of sheet supply.

Specifically, as regards the print data shown in FIG. 5, the origin of sheet supply for the first page, whose image data is A4 image data, is the large-capacity cassette 52. The origin of sheet supply for the second and third pages, whose image data is A3 image data, is the upper cassette 48. The origin of sheet supply for the fourth and fifth pages, whose image data is B4 image data, is the middle cassette 50.

Accordingly, three job files for print data are created: a job file F1 for the image data of the first page; a job file F2 for the image data of the second and third pages; and a job file F3 for the image data of the fourth and fifth pages.

FIG. 7 shows an example of the job file F1 for the first page, the origin of sheet supply for which is the large-capacity cassette 52. As is shown in FIG. 7, the job file F1 comprises a job header F1a, and a page header F1b and image data F1c for the first page.

In the job header F1a, the number of copies is 10, the sheet size is A4, the origin of sheet supply is the upper cassette, the double-side print designation is set to "SINGLE-SIDE", the sort mode designation is set to "SORT", and the total page number is one. In the page header F1b, the sheet size is A4 and the origin of sheet supply is the large-capacity cassette (LCF). The image data F1c is A4 image data.

FIG. 8 shows an example of the job file F2 for the second and third pages, the origin of sheet supply for which is the upper cassette 48. As is shown in FIG. 8, the job file F2 comprises a job header F2a, and page headers F2a and image data F2a for the two pages.

In the job header F2a, the number of copies is 10, the sheet size is A3, the origin of sheet supply is the lower cassette, the double-side print designation is set to "DOUBLE-SIDE", the sort mode designation is set to "SORT", and the total page number is two. In the page header F2b, the sheet size is A3 and the origin of sheet supply is the upper cassette. The image data F2c is A3 image data.

FIG. 9 shows an example of the job file F3 for the fourth and fifth pages, the origin of sheet supply for which is the middle cassette 50. As is shown in FIG. 9, the job file F3 comprises a job header F3a, and page headers F3b and image data F3c for the two pages.

In the job header F3a, the number of copies is 10, the sheet size is B4, the origin of sheet supply is the large-capacity cassette, the double-side print designation is set to "DOUBLE-SIDE", the sort mode designation is set to "SORT", and the total page number is two. In the page header F3b, the sheet size is B4 and the origin of sheet supply is the middle cassette. The image data F3c is B4 image data.

Figure 10:
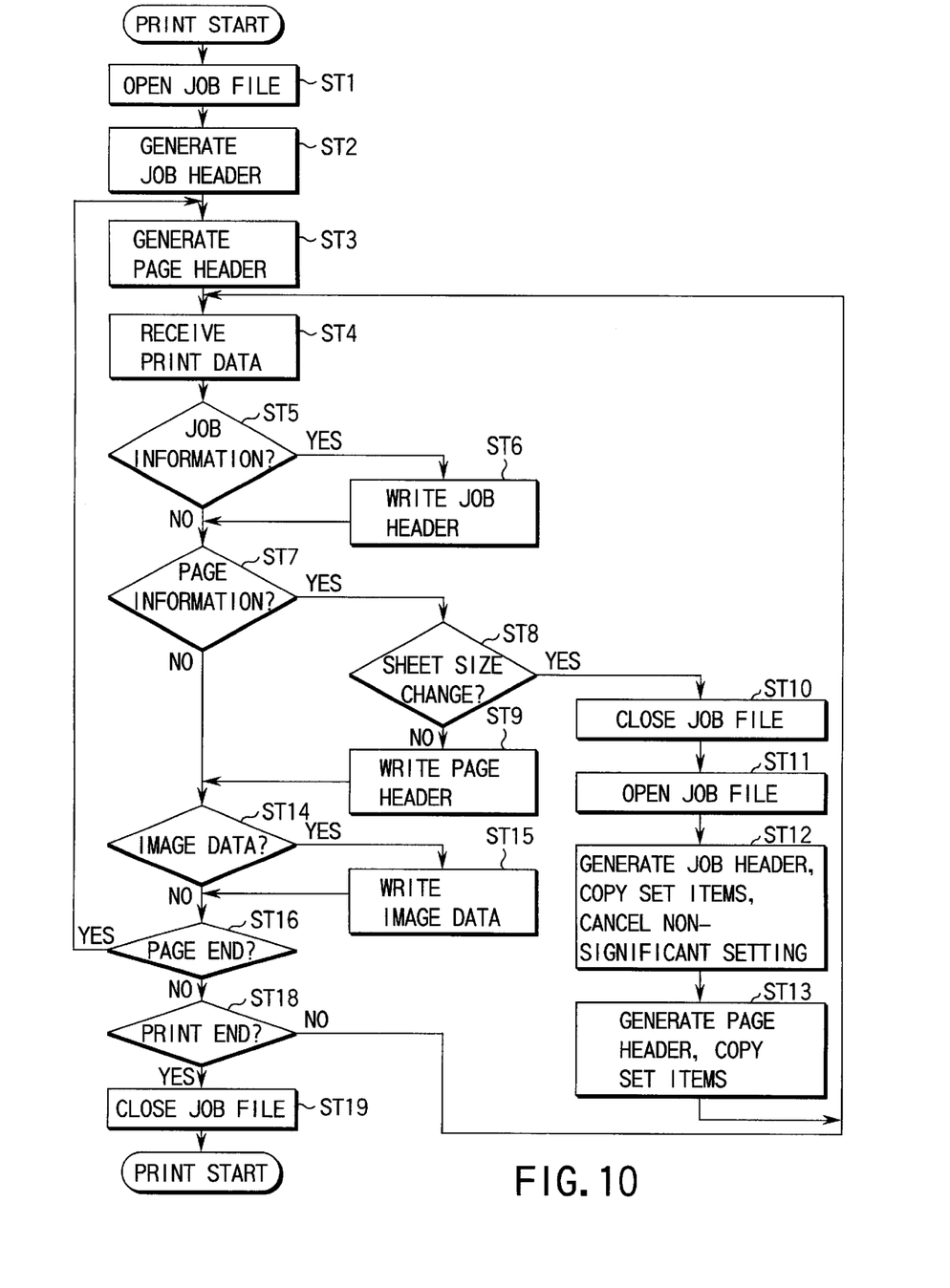
FIG. 10 is a flow chart illustrating an operation for generating files from print data on the basis of a sheet size.

An operation for forming divided job files from print data on the basis of the sheet size will now be described with reference to a flow chart of FIG. 10.

Assume that the print data shown in FIG. 5 has been transmitted from the personal computer PC, or the external apparatus, to the digital copying machine 1 via the LAN, as described above.

If reception of print data is started, the SM-CPU 101 opens a file in the hard-disk drive 110 (step ST1), generates a job header (step ST2) and generates a page header (step ST3).

The SM-CPU 101 receives the print data from the personal computer PC via the network interface 111 (step ST4). If the received information is job information (step ST5), the CPU 101 writes information in the respective items of the job header generated in step ST2 (step ST6).

If the received information is not job information in step ST5 but is page information (step ST7), the SM-CPU 101 compares the sheet size of the page information with the sheet size of the previous page. If the sheet size is unchanged, information on the sheet size and origin of sheet supply is written in the page header generated in step ST3 (step ST9).

If the sheet size is changed in step ST8, the SM-CPU 101 closes the job file which is being generated (step ST10) and opens a new job file (step ST11). In the newly opened job file, a job header is generated by canceling non-significant setting in the job header of the closed job file and copying the set items (step ST12), and also a page header is generated by copying the set items (step ST13). Then, control goes to step ST4.

If the received information is not page information in step ST7 but image data (step ST14), the SM-CPU 101 writes the image data following the page header generated in step ST3 or step ST13 (step ST15). If the page ends, control goes to step ST3 (step ST16).

If the information is not the image data in step ST14, if the page does not end in step ST 16 and if the generation of the job file for print data is not completed (step ST18), the SM-CPU 101 shifts control to step ST4. If the generation of the job file is completed in step ST18, the SM-CPU 101 closes the job file (step ST19) and finishes storage of print data in the hard-disk drive 110.

By generating the job files individually on the basis of the origin of sheet supply, as described above, the job can easily be executed for each sheet size and the print process time can be shortened. Moreover, since the same sheet size is allocated to each job, the process is simplified.

A description will now be given of an operation of the digital copying machine in a case where there are a plurality of job files in the hard-disk drive 110.

Assume, for example, that the job files F1 to F3 illustrated in FIGS. 7 to 9 associated with the print data shown in FIG. 5 are stored in the hard-disk drive 110. In this case, the SM-CPU 101 first executes the print process for the first page on the basis of the job file F1.

As regards the first page, the origin of sheet supply is the large-capacity cassette 52 and the sheet size is A4. Accordingly, the SM-CPU 101 feeds A4 paper sheets from the large-capacity cassette 52 and prints the image data on the fed sheets.

If the print process based on the job file F1 is completed, the SM-CPU 101 executes print processes for the second and third pages on the basis of the job file F2. As regards the second and third pages, the origin of sheet supply is the upper cassette 48 and the sheet size is A3. Accordingly, the SM-CPU 101 feeds A3 paper sheets from the upper cassette 48 and prints the image data of the second and third pages on the fed sheets.

If the print process based on the job file F2 is completed, the SM-CPU 101 executes print processes for the fourth and fifth pages on the basis of the job file F3. As regards the fourth and fifth pages, the origin of sheet supply is the middle cassette 50 and the sheet size is B4. Accordingly, the SM-CPU 101 feeds paper sheets from the middle cassette 50 and prints the image data of the fourth and fifth pages on the fed sheets.

If the print process based on the job file F3 ends, the print process for the print data from the personal computer is completed.

In the above-described processes, if paper sheets run out in the upper cassette 48, or the origin of sheet supply, when the print process based on the job file F2 is executed, the SM-CPU 101 suspends the print process based on the job file F2 and executes the print process based on the job file F3. In this case, instead of the page, the printing of which was suspended due to run-out of sheets, a paper sheet is fed from another available cassette and a message to the effect that the printing was not normally executed is printed and output.

Figure 11:
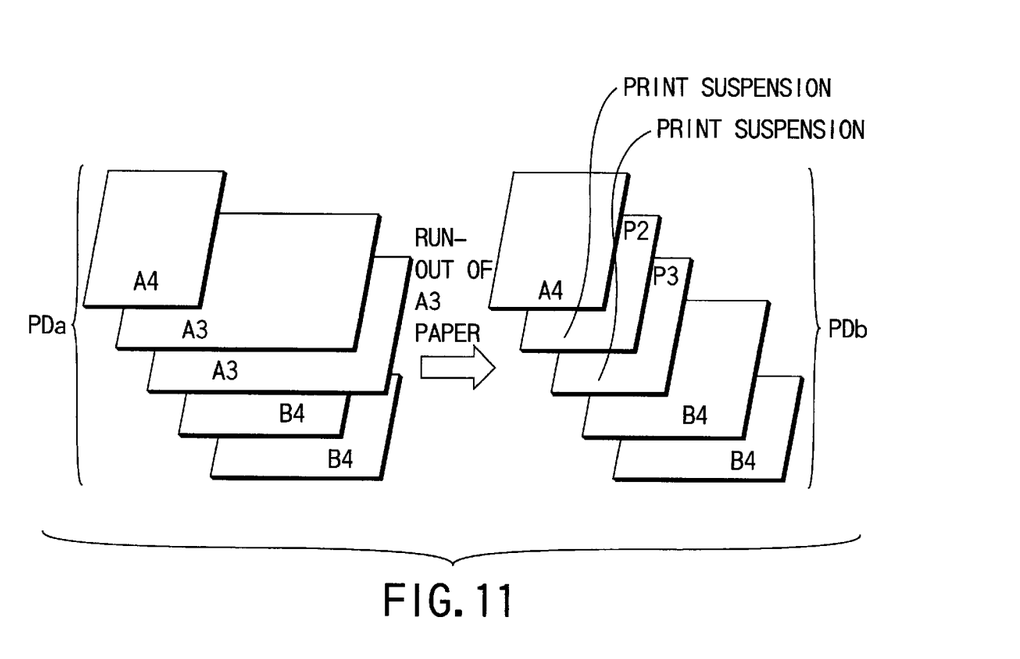
FIG. 11 illustrates a relationship between print data and print results.

Specifically, as regards print data PDa consisting of A4, A3, A3, B4 and B4 as shown in FIG. 11, where printing is disabled due to run-out of sheets in the cassette which is designated as the origin of sheet supply in the job file F for the second and third pages, the print job for the second and third pages is suspended.

The cassette capable of feeding the same number of sheets as the second and third pages, the printing of which was suspended, is determined. Sheets are fed from this available cassette. A message to the effect that printing is suspended due to run-out of sheets is printed on the fed sheets, as shown in FIG. 11, and the sheets are output. Following the output of the substitutes for the second and third pages, the print process for the fourth and fifth pages is executed. Thus, a print result PDb is output, as shown in FIG. 11.

As described above, where any one of a plurality of print jobs is not normally executable due to some cause such as run-out of paper, the print job which is not normally executable is suspended and another subsequent job is executed.

Thereby, even where any one of a plurality of print jobs is not normally executable, another subsequent job can be executed without halting the operation of the copying machine.

As regards the pages which are not printed due to run-out of paper, sheets are fed from another cassette and a message to the effect that printing was suspended is printed thereon and the sheets are output. Thereby, which page was not printed can be easily understood and also the reason of suspension of printing can easily be understood.

Furthermore, where a print job relates to a print process of print data received via the LAN, information indicating the data on the print suspension such as the page number and the number of pages associated with the print suspension is sent to the origin of the print data. Specifically, where the print job is suspended due to run-out of paper, the origin of the print data is found on the basis of the job header. If the origin of the print data is found, information indicating the data on the print suspension such as the page number and the number of pages associated with the print suspension is sent to the origin of the print data.

Figure 12:
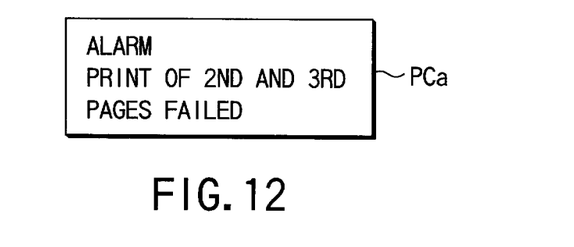
FIG. 12 shows an example of a display image indicating an alarm with respect to the content of suspended printing.

At the origin of print data which has received the information, the display section PCa displays the data on the print suspension as an alarm, as shown in FIG. 12. Thereby, the user can recognize the information on the page number, etc. associated with the print suspension by means of the apparatus which sent the print data.

An operation of the digital copying machine in association with the job file will now be described in detail.

Figure 13:
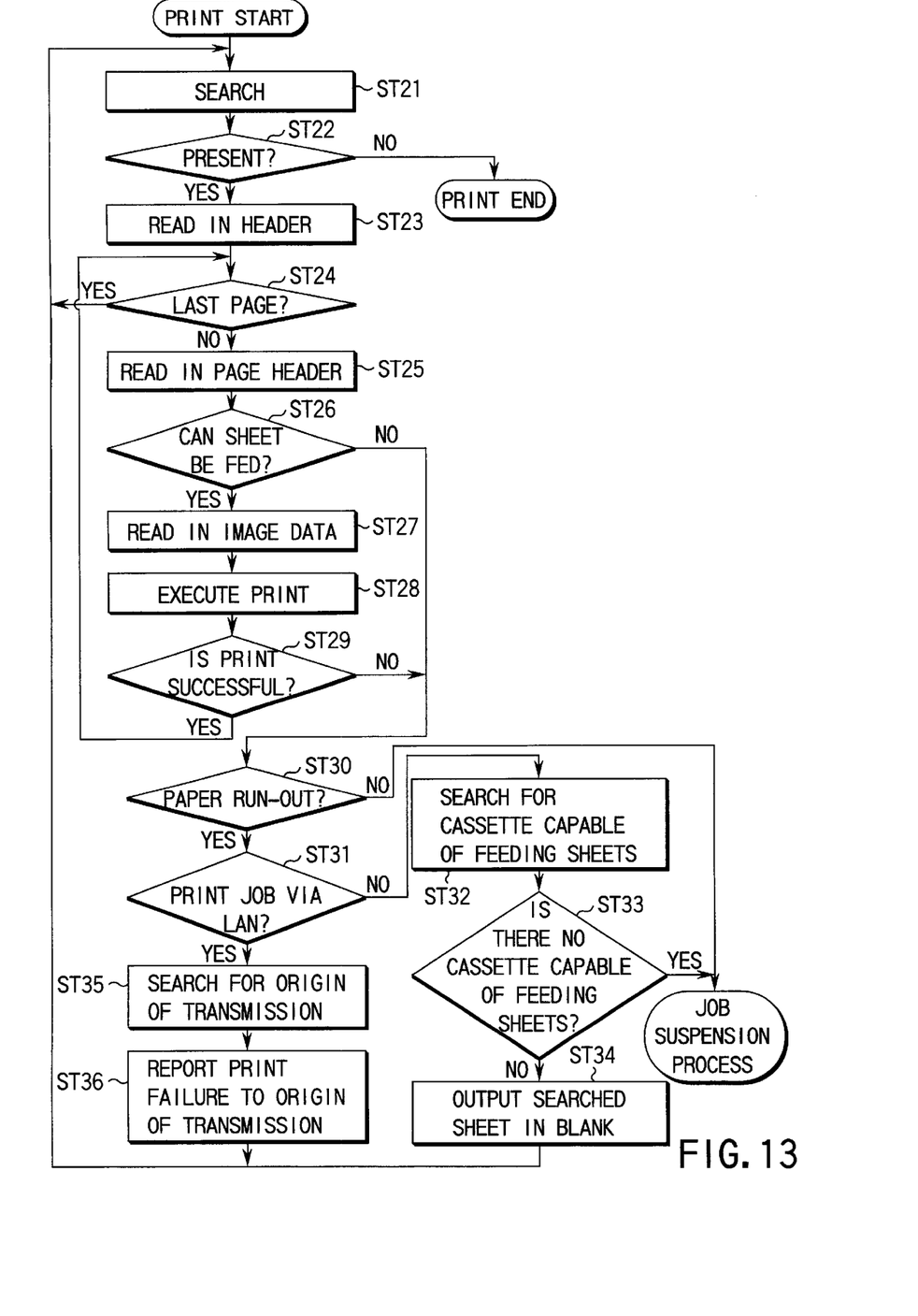
FIG. 13 is a flow chart illustrating a print operation in a case where there are a plurality of job files.

FIG. 13 is a flow chart illustrating a print operation in a case where there are a plurality of job files.

To start with, the SM-CPU 101 searches the hard-disk drive 110 (step ST21) and determines whether there is a job file (step ST22). If the determination result indicates the absence of a job file, the SM-CPU 110 finishes the print process.

If the determination result in step ST22 indicates the presence of the job file, the SM-CPU 110 reads in a job header of the first job file (step ST23).

The SM-CPU 101 then determines whether the last page of the job file has ended (step ST24). If the determination result indicates that the last page has ended, the SM-CPU 101 returns to step ST21 and searches for the next job file.

If the last page has not yet been processed in step ST24, the SM-CPU 101 reads in the page header (step ST25). If the page header is read in, the SM-CPU 101 determines whether paper sheets can be fed from the cassette, or the origin of sheet supply, designated by the page header (step ST26). If it is determined that paper sheets can be fed, the SM-CPU 101 reads in image data corresponding to the page header from the job file (step ST27).

If the image data corresponding to the page header is read in, the SM-CPU 101 executes the print operation for the image data (step ST28). The SM-CPU 101 determines whether the print operation is successfully completed (step ST29). Where the print operation has successfully been completed, the SM-CPU 101 returns to step ST24 to check the last page and to execute the print process for the next page.

If it is determined in step ST26 that paper sheets cannot be fed or if it is determined in step ST29 that the printing failed, the SM-CPU 101 determines whether the cause is run-out of paper (step ST31). In step ST31, run-out of paper in the designated cassette is checked, but the same step is executed even where sheets cannot be fed due to a fault associated with the paper feeding from the cassette.

If it is determined that the cause is run-out of paper, the SM-CPU 101 determines whether the print job is a print job for print data received from the external apparatus via the LAN (step ST31).

If it is determined that the print job is not a print job for the print data, that is, the print job is a copy job, etc., the SM-CPU 101 finds the feed cassette capable of feeding paper sheets (step ST32).

If the cassette capable of feeding paper sheets is found (step ST33), the SM-CPU 101 feeds sheets from the found cassette, prints on the sheets the information on the content of the print job or a reason for failed printing, and outputs the sheets (step ST34). The number of such output printed sheets corresponds to the number of pages for which printing failed.

In this case, the data printed on the sheet is, for example, a file name, the origin of print data, page number, the sheet size of run-out paper, or the feed cassette. A single sheet, on which information including the number of pages associated with failed printing is printed in addition to the above data, may be output.

The same number of blank sheets as the pages on which printing failed may be fed and output from the cassette found in step ST33. In this case, this number of sheets, which are different from the sheets to be normally printed, are inserted in the print result.

If it is determined in step S31 that the print job is a print job for print data received via the LAN, the SM-CPU 101 searches for the origin of the print data (step ST35). When the origin of the print data is found, the SM-CPU 101 informs the personal computer, or the origin of print data, of the information indicating the content of failed printing (step ST36). Thereby, the personal computer PC causes the display section PCa to display the content of the failed printing, and alarms the user.

When the sheet on which the content of the print job is printed is output in step ST34 or the content of the failed printing is reported to the origin of the print data, the SM-CPU 101 returns to step ST21 to find the next job file. Thereby, the next job is executed.

Where it is determined in step ST31 that the cause is not run-out of paper or it is determined in step ST32 that there is no cassette capable of feeding sheets, the SM-CPU 101 determines that another error has occurred to disable the print process, and suspends the print process. Thus, the apparatus is set in the print suspension state.

In the above embodiment, where the print process for print data received via the LAN is suspended, the content of failed printing is reported to the origin of the print data and the process for the next job file is executed. However, after the content of failed printing is reported to the origin of the print data, control may be shifted to step ST32 to print substitutes for the page on which printing failed.

In this case, the user can recognize the print suspension at the origin of the print data such as the personal computer, and can easily understand from the print result the position at which the printing was suspended.

As has been described above, where any one of a plurality of print jobs becomes unexecutable, the unexecutable print job is suspended and the next print job is successively executed. Thereby, the print process can be continuously performed without interruption.

As regards the failed print job, a sheet on which a reason, etc. for failed printing is printed is output. Thereby, the user can easily understand from the print result where the failed print job should have normally been positioned.

Where the print job is suspended due to run-out of paper, the origin of the print data is found from the job header and the failure of printing is reported to the origin. Upon receiving the report, the origin, or the external apparatus, displays the print data as an alarm message. Thereby, the user can easily recognize the content of the failed printing at the origin of the print data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming method for an image forming apparatus comprising a plurality of storage sections for respectively containing various image forming mediums, a memory for storing operation files composed of image formation conditions and image information for respective pages, and an image forming section for selecting the storage section in accordance with the image formation conditions of the operation files stored in said memory and performing an image forming process with image formation on the image forming mediums stored in the selected storage section, wherein where the image forming process based on any one of the plurality of operation files stored in the memory is not normally executable, the image forming process based on the operation file which is not normally executable is suspended, when the image forming process based on the operation file which is not normally executable is suspended, information indicating the suspension of the image forming process is formed by the image forming section on the image formation medium stored in a storage section other than the storage section designated by the operation file and the image formation medium is output, and the image forming process based on an operation file other than the operation file associated with the suspended image forming process is successively executed.

2. An image forming method according to claim 1, wherein when the image forming process based on the operation file which is not normally executable is suspended, the same number of image formation mediums as the pages associated with the suspended image forming process are output from a storage section other than the storage section designated by the operation file such that no image is formed on said image formation mediums.

3. An image forming method for an image forming apparatus comprising a plurality of storage sections for respectively containing various image forming mediums, a memory for storing operation files composed of image formation conditions and image information for respective pages, and an image forming section for selecting the storage section in accordance with the image formation conditions of the operation files stored in said memory and performing an image forming process with image formation on the image forming mediums stored in the selected storage section, wherein where the image forming process based on any one of the plurality of operation files stored in the memory is not normally executable, the image forming process based on the operation file which is not normally executable is suspended, when the image forming process based on the operation file which is not normally executable is suspended, information indicating the suspension of the image forming process is formed by the image forming section on the image formation medium stored in a storage section other than the storage section designated by the operation file and the image formation medium is output, and the image forming process based on an operation file other than the operation file associated with the suspended image forming process is successively executed.

4. An image forming method according to claim 3, wherein when the image forming process based on the operation file which is not normally executable is suspended, information indicating the page or the operation file associated with the suspended image forming process is formed by the image forming section on the image formation medium stored in a storage section other than the storage section designated by the operation file and the image formation medium is output.

5. An image forming method for an image forming apparatus comprising a plurality of storage sections for respectively containing various image forming mediums, a memory for storing operation files composed of image formation conditions and image information for respective pages, an image forming section for selecting the storage section in accordance with the image formation conditions of the operation files stored in said memory and performing an image forming process with image formation on the image forming mediums stored in the selected storage section, an interface for receiving from an external apparatus image formation information composed of image formation conditions and image information for respective pages, and a control section for generating operation files on the basis of the image formation information received by the interface, the operation files being stored in said memory, wherein where the image forming process based on any one of the plurality operation files stored in the memory is not normally executable, the image forming process based on the operation file which is not normally executable is suspended, when the image forming process based on the operation file which is not normally executable is suspended, information indicative of the page associated with the suspended image forming process is reported to the external apparatus, or the origin of transmission of the image formation information is information indicative of the page associated with the suspended image forming process, and the image forming process based on an operation file other than the operation file associated with the suspended image forming process is successively executed.

6. An image forming method according to claim 5, wherein when the image forming process based on the operation file which is not normally executable is suspended, information indicative of the page associated with the suspended image forming process is reported to the external apparatus, or the origin of transmission of the image formation information, and the same number of image formation mediums as the pages associated with the suspended image forming process are output from a storage section other than the storage section designated by the operation file such that no image is formed on said image formation mediums.

7. An image forming method according to claim 5, wherein when the image forming process based on the operation file which is not normally executable is suspended, information indicative of the page associated with the suspended image forming process is reported to the external apparatus, or the origin of transmission of the image formation information, and information indicating the suspension of the image forming process is formed by the image forming section on the image formation medium stored in a storage section other than the storage section designated by the operation file and the image formation medium is output.

8. An image forming apparatus comprising:
a plurality of storage sections for respectively containing various image forming mediums;
a memory for storing operation files composed of image formation conditions and image information for respective pages;
an image forming section for selecting the storage section in accordance with the image formation conditions of the operation files stored in said memory and performing an image forming process with image formation on the image forming mediums stored in the selected storage section; and
a control section for suspending, where the image forming process based on any one of the plurality of operation files stored in the memory is not normally executable, the image forming process based on the operation file which is not normally executable, causing the image forming section to form information indicating the suspension of the image forming process on the image formation medium stored in a storage section other than the storage section designated by the operation file, outputting the image formation medium, and successively executing the image forming process based on an operation file other than the operation file associated with the suspended image forming process.

9. An image forming apparatus according to claim 8, wherein said control section outputs, when the image forming process based on the operation file which is not normally executable is suspended, the same number of image formation mediums as the pages associated with the suspended image forming process from a storage other than the storage section designated by the operation file such that no image is formed on said image formation mediums.

10. An image forming apparatus according to claim 8, wherein said control section causes the image forming section to form, when the image forming process based on the operation file which is not normally executable is suspended, information indicating the page or the operation file associated with the suspended image forming process on the image formation medium stored in a storage section other than the storage section designated by the operation file, and outputs the image formation medium.

11. An image forming apparatus comprising:
a plurality of storage sections for respectively containing various image forming mediums;
a memory for storing operation files composed of image formation conditions and image information for respective pages;
an image forming section for selecting the storage section in accordance with the image formation conditions of the operation files stored in said memory and performing an image forming process with image formation on the image forming mediums stored in the selected storage section;
an interface for receiving from an external apparatus image formation information composed of image formation conditions and image information for respective pages; and
a control section for generating operation files on the basis of the image formation information received by the interface, the operation files being stored in said memory,
wherein said control section suspends, where the image forming process based on any one of the plurality of operation files stored in the memory is not normally executable, the image forming process based on the operation file which is not normally executable, reports information indicative of the page associated with the suspended image forming process to the external apparatus, or the origin of transmission of the image formation information, and successively executes the image forming process based on an operation file other than the operation file associated with the suspended image forming process is successively executed.

12. An image forming apparatus according to claim 11, wherein said control section reports, when the image forming process based on the operation file which is not normally executable is suspended, information indicative of the page associated with the suspended image forming process to the external apparatus, or the origin of transmission of the image formation information, and outputs the same number of image formation mediums as the pages associated with the suspended image forming process from a storage section other than the storage section designated by the operation file such that no image is formed on said image formation mediums.

13. An image forming apparatus according to claim 11, wherein said control section causes reports, when the image forming process based on the operation file which is not normally executable is suspended, information indicative of the page associated with the suspended image forming process to the external apparatus, or the origin of transmission of the image formation information, causes the image forming section to form information indicating the suspension of the image forming process on the image formation medium stored in a storage section other than the storage section designated by the operation file, and outputs the image formation medium.

14. An image forming method for an image forming system comprising an image forming apparatus having a plurality of storage sections for respectively containing various image forming mediums, a memory for storing operation files composed of image formation conditions and image information for respective pages, and an image forming section for selecting the storage means in accordance with the image formation conditions of the operation files stored in said memory and performing an image forming process with image formation on the image forming mediums stored in the selected storage section, and an external apparatus having a display section for displaying guidance to a user and being connected to said image forming apparatus, wherein said image forming apparatus receives from the external apparatus image formation information composed of image formation conditions and image information for respective pages, operation files to be stored in said memory are generated on the basis of the received image formation information, where the image forming process based on any one of the plurality of operation files stored in the memory is not normally executable, the image forming process based on the operation file which is not normally executable is suspended, when the image forming process based on the operation file which is not normally executable is suspended, information indicative of the page associated with the suspended image forming process is reported to the external apparatus, or the origin of transmission of the image formation information, and the image forming process based on an operation file other than the operation file associated with the suspended image forming process is successively executed, and the external apparatus which has received the report displays on the display section the information indicative of the page associated with the suspended image forming process.

15. An image forming method according to claim 14, wherein when the image forming process based on the operation file which is not normally executable is suspended, information indicative of the page associated with the suspended image forming process is reported to the external apparatus, or the origin of transmission of the image formation information, and the same number of image formation mediums as the pages associated with the suspended image forming process are output from a storage section other than the storage section designated by the operation file such that no image is formed on said image formation mediums.

16. An image forming method according to claim 14, wherein when the image forming process based on the operation file which is not normally executable is suspended, information indicative of the page associated with the suspended image forming process is reported to the external apparatus, or the origin of transmission of the image formation information, and information indicating the suspension of the image forming process is formed by the image forming section on the image formation medium stored in a storage section other than the storage section designated by the operation file and the image formation medium is output.

* * * * *